Sept. 3, 1968     J. G. NIGHTINGALE ET AL     3,400,222

MESSAGE UNIT CHARGING AND BILLING EQUIPMENT

Filed April 23, 1963     7 Sheets-Sheet 1

FIG. I

INVENTORS
J. G. NIGHTINGALE
J. M. REPHOLZ
J. C. SIEGLINGER
S. ZAK

BY
R.C. Winter
ATTORNEY

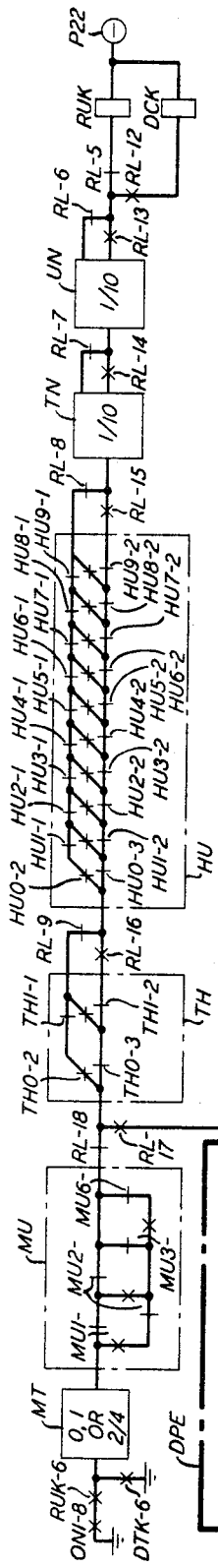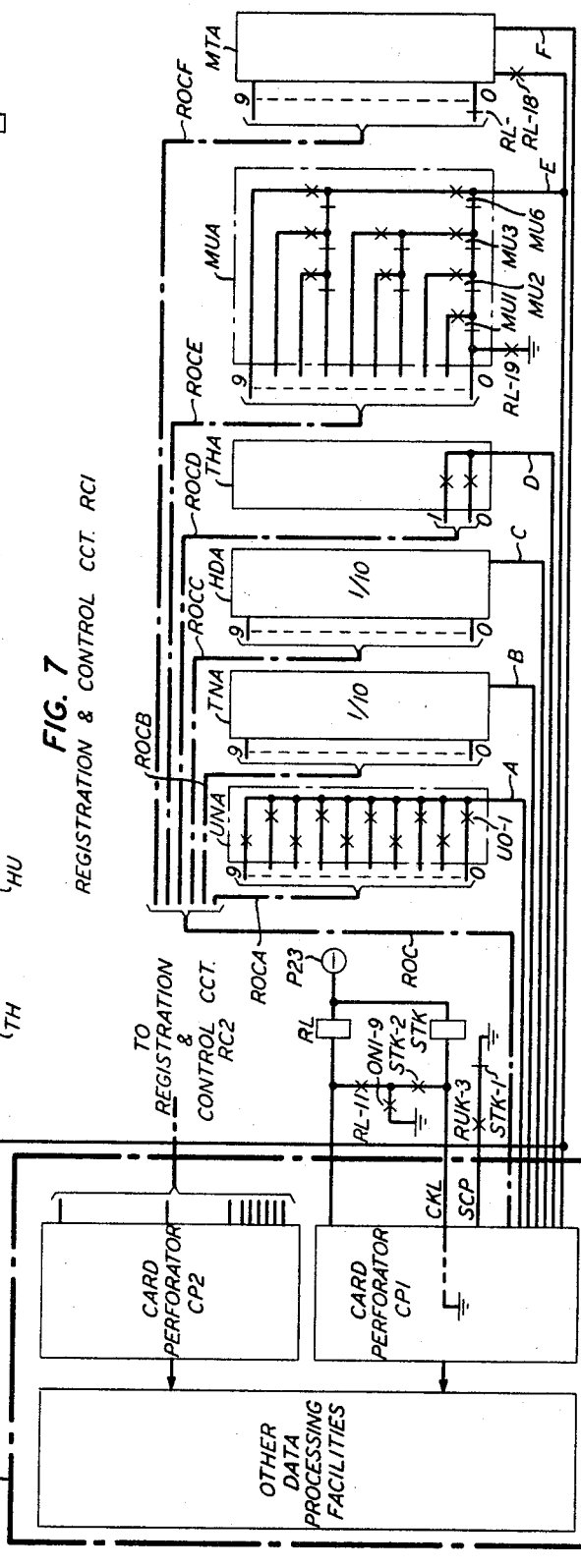
FIG. 7 REGISTRATION & CONTROL CCT. RC1

United States Patent Office 3,400,222
Patented Sept. 3, 1968

3,400,222
MESSAGE UNIT CHARGING AND BILLING
EQUIPMENT
John G. Nightingale, Fair Lawn, N.J., John M. Repholz,
New York, N.Y., John C. Sieglinger, Short Hills, N.J.,
and Stanley Zak, Port Chester, N.Y., assignors to American Telephone and Telegraph Company, New York,
N.Y., a corporation of New York
Filed Apr. 23, 1963, Ser. No. 275,008
19 Claims. (Cl. 179—7.1)

ABSTRACT OF THE DISCLOSURE

A private branch exchange telephone system is disclosed having message unit charging and billing equipment. This equipment includes trunk circuit facilities for counting individual message units and surcharges for calls. Circuitry is also provided for automatically identifying the calling telephone number upon the completion of each call. Registration and control circuits register the identified telephone number and counted message units on each completed call and control the perforation of records therefor which are supplied to a data processor for automatically producing a bill for the calling number.

---

Figure 1:
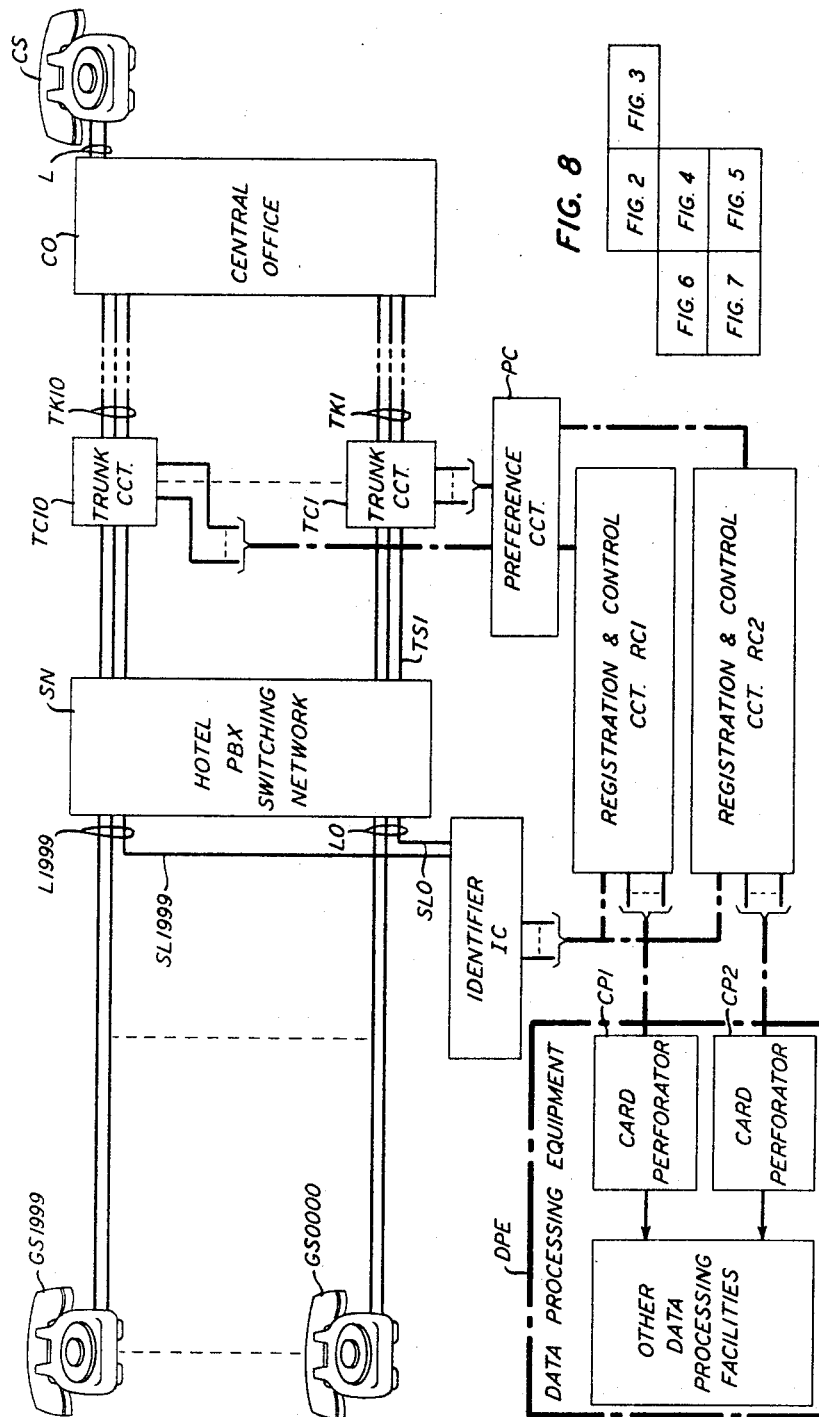

This invention relates to automatic switching systems and particularly to equipment for automatically charging and billing telephone customers for calls served on a message rate basis. The invention further relates to equipment which enables a business establishment such as a hotel to automatically provide its guests with bills for telephone calls originated from guest rooms.

Business establishments, such as hotels and hospitals, are often furnished with numerous telephone stations for the convenience of their customers. Such establishments customarily assign these stations to their customers on an exclusive basis for designated periods and charge them for certain calls originated therefrom. In some instances, the charges for such calls are assessed by a switchboard operator and forwarded to the establishment's accounting department for billing the customer. In other instances, the charges for these calls are assessed automatically against the calling station on a message rate basis.

With a message rate class-of-telephone service, an individual message register is located on the business premises for each of the stations. Each of these registers is actuated during each call under the control of the telephone office equipment to provide a visual display of the number of message units assessed against the associated station for telephone calls.

For charging and billing purposes, the number of message units displayed by a message register is recorded by an employee of the business establishment at the time that the associated telephone station is assigned to a customer and again when the customer desires to terminate the telephone service. Finally, the employee computes the telephone charges from the recorded numbers and enters them on the customer's bill.

While the foregoing procedures are generally reliable and provide adequate information for enabling the business establishment to charge and bill its customers for telephone service, they have proven too complex, costly and time consuming. It would appear that these procedures could be simplified and, as well, the time required to complete them could be reduced by providing automatic charging and billing facilities, such as are conventionally employed in telephone systems; however, the cost of such facilities is too high in most instances to justify their use in individual business establishments.

In recent years, data processing equipment has been adapted for automatically charging and billing the customers of business establishments, such as hotels and hospitals, for a majority of services, such as lodgings and meals. This equipment has so markedly reduced the cost, time and effort required for many charging and billing operations that it is now an economically practical adjunct of businesses serving large numbers of customers.

Although such equipment performs many of the routine charging and billing operations more economically and with increased speed and accuracy, it heretofore could not be used for automatically billing customers for calls originated from assigned telephone stations of the business establishment because no facilities have been previously available for automatically supplying it with the charges for each call and the identity of the calling station. As a result, these establishments have heretofore continued to use the aforementioned manual procedures for charging and billing their customers for telephone service.

In view of the foregoing, a general object of our invention is to simplify the procedures employed for charging and billing customers for telephone calls served on a message rate basis.

Another object is to provide for the automatic charging and billing of customers of business establishments, such as hotels and hospitals, for calls originated from assigned telephone stations.

It is another object to provide for the automatic charging and billing of customers for calls originated from their assigned stations at a business establishment in a manner which is compatible with existing telephone office equipment. Thus, it is another object of this invention to provide for the automatic assessment of call charges against such customers on a message unit basis.

A further object is automatically to supply the data processing equipment of a business establishment, such as a hotel or hospital, with charge data including the identity of the calling telephone station assigned to a customer, such as a hotel guest or hospital patient, and the message units chargeable to that station for enabling that equipment to produce a bill for that customer immediately after each call has been completed.

These and other objects are attained in one illustrative embodiment according to the principles of our invention wherein switching equipment is incorporated into a conventional private branch exchange (PBX) serving a hotel for enabling that hotel to charge and bill its guests automatically for telephone calls originated from guest room telephone stations. This equipment automatically ascertains the identity of the calling telephone number and the number of message units charged against that number on each completed call and supplies these numbers to the hotel data processing equipment for automatically billing the guest.

In accordance with this embodiment, a guest may originate a call from his assigned guest room by dialing connections through the PBX switching network and a trunk circuit to the telephone central office arranged for completing the connections to the called station. While the call is in progress, the central office sends the usual message unit pulses to the trunk circuit at periodic intervals for charging purposes. The trunk circuit includes circuitry for counting each pulse received from the central office and for automatically adding the hotel surcharge of three message units for each call.

Upon the termination of the call, the trunk circuit detects the calling or called party disconnect and holds the call connections through the PBX switching network to the calling station for subsequently enabling a station identifier circuit to ascertain the calling telephone number. At the same time, the trunk circuit seizes an idle one of a pair of registration and control circuits and then transfers the counted number of message units from its counting circuit to a register in the seized circuit. The latter circuit then controls the application of a marking potential from the trunk circuit through the held connections to activate a station identifier for identifying the calling telephone number.

After the latter operation has been completed, the identified number is transferred from the identifier to a register in the seized registration and control circuit. The trunk circuit and identifier as well as the connections through the switching network are then released. In the meantime, the seized registration and control circuit sequentially transfers the registered numbers to a perforator of the hotel data processing equipment for perforating a card record of the charge data. This card is then stored by the equipment for subsequent processing with other charge cards to produce the guest's check-out bill. After all of the charge cards for the guest have been processed, they are canceled and the data processing equipment is prepared to make new charge cards for the next guest checking into the vacated guest room.

An advantage of our invention is that business establishments, such as hotels, are now able to charge and bill their customers on an automatic basis more accurately and quickly as well as at less cost than heretofore with the aforementioned manual charging and billing procedures. Another advantage is that the equipment offered by our invention requires no modification or addition to existing telephone office equipment for performing the automatic charging and billing operations.

A feature of our invention is the provision of telephone call charging and billing equipment that counts the number of message units assessed at periodic intervals for each call while it is in progress, identifies the number of the calling station at the end of the call, registers the assessed number of message units and the calling station number, and then produces a record of the registered numbers for billing purposes.

Another feature is that the calls from the telephone stations on the premises of a business establishment are extended to the called station via a trunk circuit which assesses the message unit charges for each call by counting the number of message unit pulses received at periodic intervals from an associated telephone office and automatically supplies the assessed number of message units to a registration and control circuit for producing a record of the assessed units and the calling station number at the end of the call.

A further feature is that the counting facilities in the trunk circuit comprise circuitry responsive to a prescribed one of the message unit pulses received from the telephone office for automatically adding to the assessed charges a predetermined number of message units as a surcharge by the business establishment for the call.

Another feature is that the counting facilities of the trunk circuit may count a predetermined number of pulses in assessing message unit charges for a call, transfer the assessed units to a registration and control circuit for producing a record of the assessed units and the calling station number before the end of the call, and then recycle to count other message unit pulses receivable during the remainder of the call.

A further feature, directly related to the immediately preceding one is that the counting facilities further comprise apparatus for blocking the assessment of any additional surcharge message units for the call after the facilities have been recycled.

Still another feature is that the trunk circuit further comprises circuitry responsive to the disconnection of the calling or called stations for transferring the assessed number of message units in the counting facilities at that time to a registration and control circuit for producing a record of these message units and the identity of the calling station.

Another feature is the provision of a plurality of trunk circuits for serving a number of simultaneous calls and for assessing message unit charges for the calls, a pair of registration and control circuits, and a preference circuit to control the availability of the registration and control circuits for registering assessed message units and the order of preference in which the trunk circuits are connected to an available registration and control circuit for transferring the message units assessed for a call.

Another feature is that each trunk circuit further comprises apparatus controllable by a registration and control circuit after the disconnection of the calling or called party for supplying a marking potential to a calling line to activate a station identifier for identifying the number of the calling station and transferring that number to the registration and control circuit which thereafter controls the automatic production of a record of the transferred number and the message units chargeable to that number.

Yet another feature is the provision of charging and billing equipment in a telephone system having a plurality of lines and a trunk circuit as well as automatic switching equipment for interconnecting calling and called lines via the trunk circuit and wherein the equipment includes in the trunk circuit a counter responsive to timed signals received at periodic intervals during a call for counting the charges for the call, apparatus responsive to one of the signals for adding a surcharge to the charge count, holding means activated upon the termination of the call for applying a potential to the switching equipment to hold the call connections to the calling station and marking means for applying a potential through the call connections to the calling line; an identifier responsive to the receipt of the marking potential from the calling line for identifying the number of the calling station, a charge register for registering the charges counted by the counter, a station number register for registering the identified station number, circuitry activated by both of the registers for sequentially reading the registered charges and station number, a perforator operated by the reading circuitry for perforating a record of the read charges and station number, and data processing equipment for automatically storing the perforated record and subsequently producing a bill for said call.

The foregoing objects, advantages and features, as well as others, of this invention may become more apparent by referring now to the drawing in which:

FIG. 1 shows in block diagram form the interrelation of the equipment units of the illustrative embodiment;

FIGS. 2-7, inclusive, show in block and schematic form the trunk circuits, a station identifier, a pair of registration and control circuits, a preference circuit, a pair of card perforators and other data processing facilities comprising the charging and billing equipment associated with the PBX switching network which establishes call connections between customer stations and a central office via the trunk circuit; and FIG. 8 depicts the position in which FIGS. 2-7 should be placed to show the cooperation between the equipment units.

It is noted that FIGS. 2-7 employ a type of schematic notation referred to as "detached-contact" in which an X crossing a line represents a normally opened contact of a relay and a bar crossing a line represents a normally closed contact of a relay; "normally" referring to the unoperated condition of a relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, vol. 74, pages 505–513.

GENERAL DESCRIPTION

The general organization of the principal equipment units of the illustrative embodiment of our invention will now be described with reference to FIG. 1. This equipment is designed to serve a hotel having 2000 guest rooms, each of which is equipped with a telephone. Each of the guest room telephone stations GS0000–GS1999 is individually connected over one of the lines L0–L1999 to the hotel PBX switching network SN. The latter network may be of the step-by-step type frequently employed in private branch exchanges and comprises the conventional line finder switches for terminating line L0–L1999 as well as selector switches having access to the central office CO via the trunk circuits TC1–TC10 and trunks TK1–TK10.

A telephone call is originated from any of the stations GS0000–GS1999 in the conventional manner by dialing a connection through network SN via one of the trunk circuits TC1–TC10, an associated one of the trunks TK1–TK10, and office CO to a called station, such as station CS via line L. After the called station answers, office CO sends a message unit pulse to a counter in the trunk circuit serving the call, which counter then assesses one message unit as the usual telephone company charge for the initial period of the call and three additional message units as a surcharge by the hotel for the call. If the duration of the call extends beyond the initial period, such as three minutes, office CO sends a message unit pulse to the aforementioned counter for each succeeding overtime period to assess additional message unit charges for the call. No additional hotel surcharge is assessed for the overtime periods.

Each of the trunk circuit counters has the capacity to count 96 message unit pulses including one for the initial period and 95 for the overtime periods, thus assessing 99 message units for the call including one for the initial period, three for the hotel surcharge and 95 for the overtime periods. In the event that a counter should receive 96 such pulses, it will cause the trunk circuit to initiate a series of circuit operations for producing a card record of the calling station number and the 99 message units charged against that number. Thereafter, the counter will be recycled for counting additional message units receivable during successive overtime periods.

Each trunk circuit is also arranged to initiate the production of a card record of the calling station number and the counted message units in its counter after either the calling or called station disconnects at the end of the call. After the call has been terminated, the call connections from trunk circuit through office CO to the called station are released.

A trunk circuit initiates the production of a card record by bidding through the preference circuit PC for connections to an available one of the registration and control circuits RC1 and RC2. Circuit PC makes circuits RC1 and RC2 alternately available for serving the trunk circuits TC1–TC10 and controls the order in which the latter circuits are served.

While bidding for preference, the trunk circuit applies a potential to the associated sleeve lead, such as lead TS1, for holding the call connections through the switching network SN to the calling station. After the trunk circuit obtains preference through circuit PC, it is connected to a registration and control circuit, such as circuit RC1, and transfers to it the assessed number of message units. At the same time the registration and control circuit activates the trunk circuit for applying a marking potential to the sleeve lead, such as lead TS1, through network SN to activate the identifier circuit IC which identifies the calling station number. Identifier IC when transfers the identified station number to the registration and control circuit. The latter circuit checks the validity of the transferred numbers and afterwards releases network SN, identifier IC and the trunk circuit.

After checking the registered numbers, the registration and control circuit activates the associated one of the card perforators CP1 or CP2 for enabling it to read out the numbers from the registration and control circuit and perforate the card record of the calling station number and the message units charged against that number. The card record is then stored for subsequent processing with other charge cards through the other data processing facilities of equipment DPE to produce the guest check-out bill.

The description herein presents only those structural details of the card perforators CP1 and CP2 as well as the other data processing facilities of equipment DPE which are necessary for an understanding of applicants' invention. The specific structural features of the equipment DPE may comprise prior art equipments. For example, the card perforators CP1, CP2 may comprise the IBM 523 Summary Card Perforator and the other data processing facilities of equipment DPE may comprise the IBM1401 Computer Processing System.

DETAILED DESCRIPTION

*Establishing call connections from a guest room station*

The detailed circuit operations involved in charging a guest for message unit calls will now be described with reference to FIGS. 2–7. For the purpose of simplifying the understanding of these operations, the description is presented by assuming that a multimessage unit call is originated by a guest at station GS0000 of FIG. 2 via the associated line L0, hotel PBX switching network SN, trunk circuit TC1, trunk TK1 and central office CO to the station CS via line L. When the caller lifts the telephone handset, switching network SN is activated to prepare for the receipt of a dialed number, and then to transmit dial tone over line L0 to the caller. The latter party thereafter proceeds to dial the directory number of station CS into network SN for effecting the interconnection of line L0 and trunk circuit TC1 via leads TT and TR.

Figure 2:
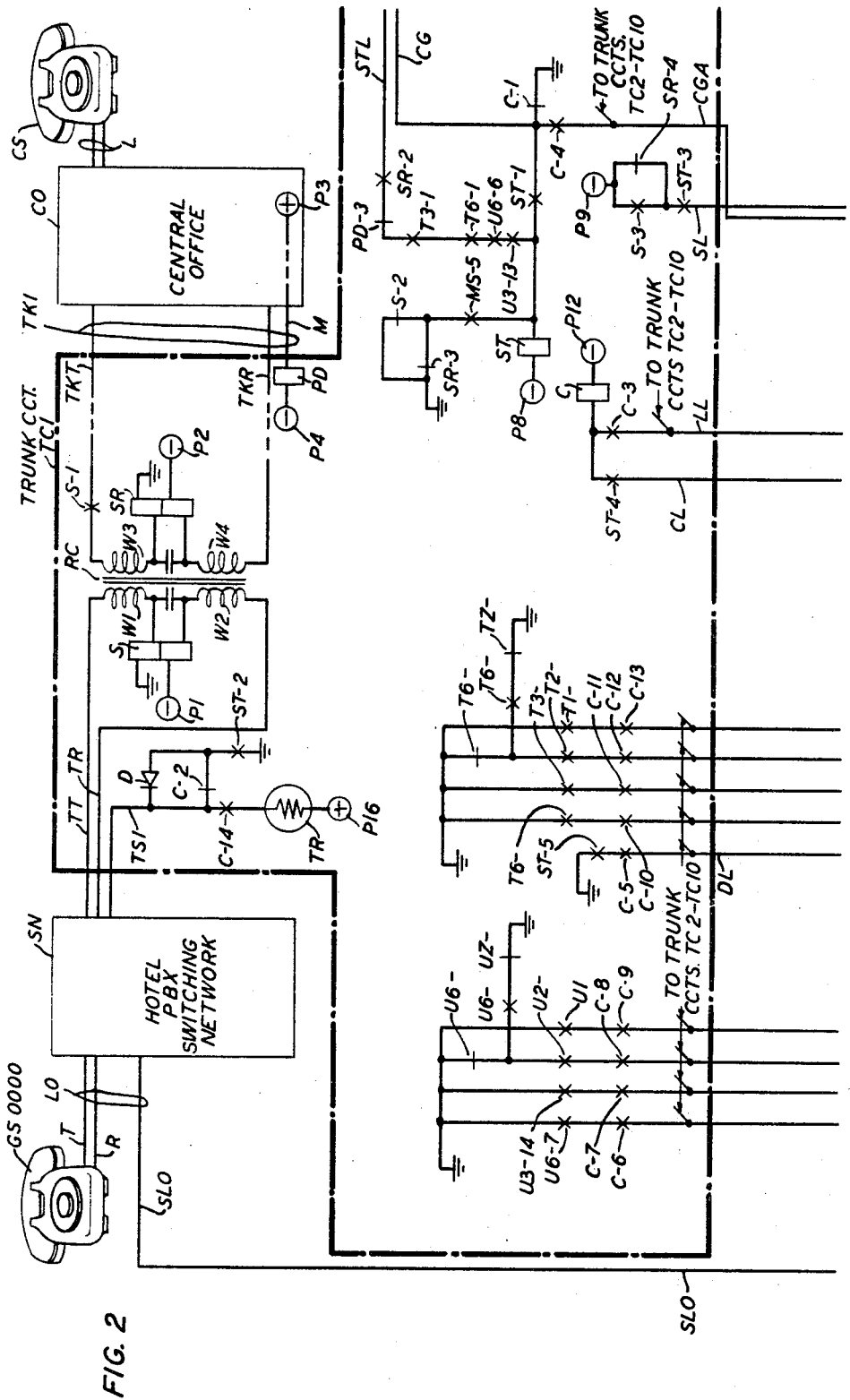

When this interconnection has been established, a circuit is completed for supplying talking potentials to the telephone at station GS0000, and for operating the supervisory relay S of FIG. 2. This circuit is from gound through the upper winding of relay S, winding W1 of the repeating coil RC, lead TT, network SN, lead T telephone station GS0000, lead R, network SN, lead TR, winding W2 of coil RC and the lower winding of relay S to the negative potential P1. Upon operating, relay S closes contact S–1 to complete a DC circuit for seizing the incoming trunk circuit (not shown) of office CO. This circuit is from ground through the upper winding of the supervisory relay SR, winding W3 of coil RC, contact S–1, lead TKT, the incoming trunk circuit (not shown), lead TKR, winding W4 of coil RC and the lower winding of relay SR to the negative potential P2. Relay SR does not operate over the last described path until after the conventional control potentials (not shown) are applied to trunk TK1 in office CO when the called party answers. After the incoming trunk circuit (not shown) is seized, the dialed information required to complete the call connections is transmitted in the conventional manner from network SN to office CO which then interconnects trunk TK1 and station CS over line L. Ringing signals are then applied to line L and, when the called party answers, the aforementioned control potentials (not shown) are applied in office CO to trunk TK1 for operating relay SR. Operated relay SR thereafter maintains called party supervision.

*Counting message unit pulses*

After the called party answers, office CO sends a first message unit pulse to circuit TC1 by momentarily applying the positive potential P3 to the lead M of trunk TK1. This potential completes the path through the winding of pulse detector relay PD to the negative potential P4 for operating relay PD. Upon operating, relay PD causes the operation of relays U1 and U3 of FIG. 3 and thereby registers four message units in the units digit counter UC of FIG. 3 as the charge for the initial period of the call. Three of these units are included as the hotel surcharge and one of the units as the customary telephone company charge for the call.

Relays U1 and U3 operate in parallel circuits extending from the negative potential P5 through the windings of relays U1 and U3, leads UL1 and UL3, contacts MS–1, MS–2 and PD–1 to ground potential. Relay U1 then locks to ground via contacts U1–1, U3–1 and UZ–1 through a control ground on lead CGL, contacts TW–1 and TZ–1, lead CG and contact C–1. Similarly, relay U3 locks via contacts U3–2 and U6–1 to ground on lead CGL.

At the end of the first message unit pulse, potential P3 of FIG. 2 is disconnected from lead M of trunk TK1 to release relay PD and thereby close ground through contacts PD–2 and U1–2, and the winding of relay MS to the negative potential P6. Relay MS then operates and locks via contacts MS–3, S–2 and SR–1 to ground.

If the duration of the call exceeds the initial period, a first overtime period commences and office CO sends a second message unit pulse by momentarily reapplying potential P3 to lead M. Relay PD thereupon reoperates and, in turn, operates relay UW of FIG. 3 in the circuit from ground through contacts PD–1, MS–4 and UW–1, lead PU, contact UW–2, the winding of relay UW and the resistor R1 to the negative potential P7. After operating, relay UW locks via contact UW–3, lead CG, and contact C–1 of FIG. 2 to ground. At the same time, relay UW effects the operation of relay U2 of FIG. 3 over the path from ground on lead CGL through contacts UW–4, U3–3 and U1–3, and the winding of relay U2 to potential P5.

Figure 3:
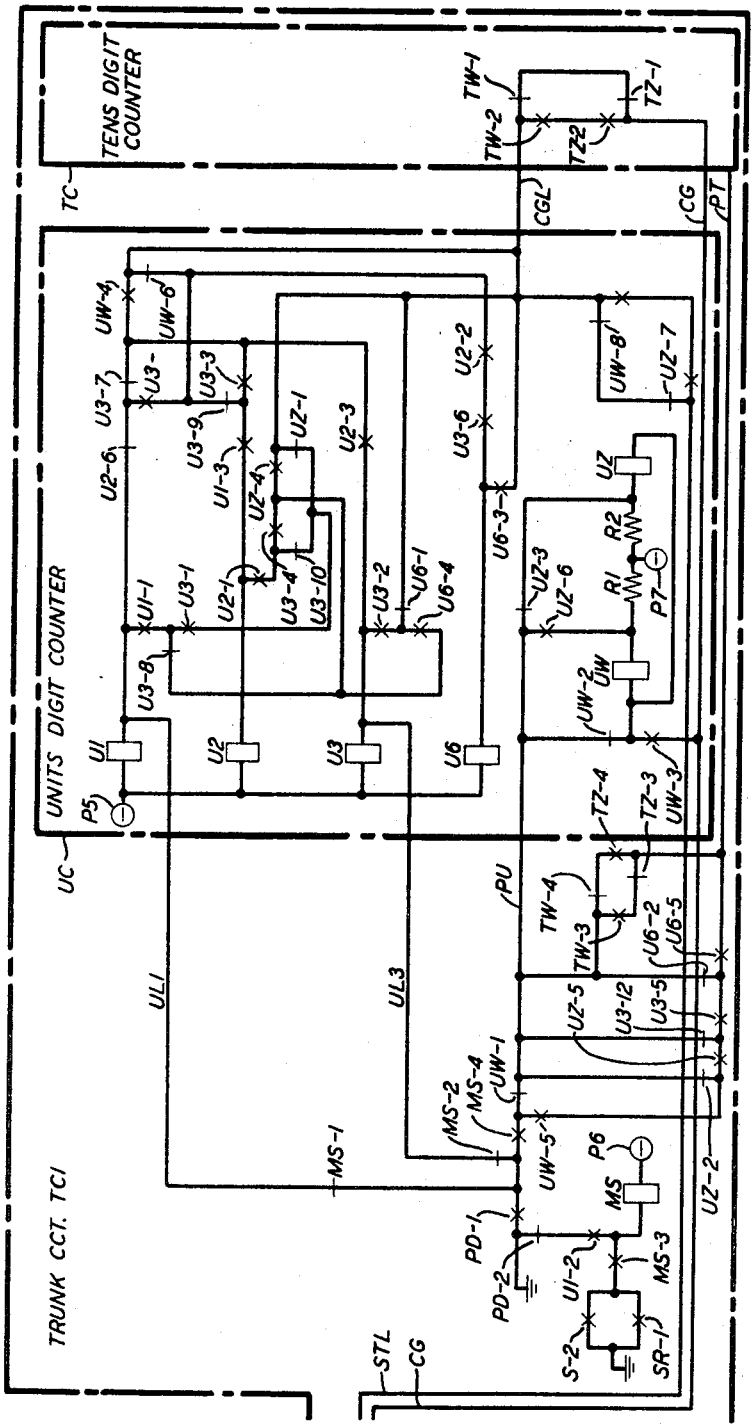

After potential P3 has been disconnected from lead M at the end of the second message unit pulse, relay PD releases opening contact PD–1 to remove the shunt-down ground applied to the winding of relay UZ of FIG. 3 via contacts MS–4, UW–5, UZ–2 and UZ–3, and thus enable relay UZ to operate over the path from ground on lead CG through contact UW–3, the winding of relay UZ and the resistor R2 to potential P7. The operation of relay UZ opens at contact UZ–1 the locking path for relay U1 which then releases. Relay UZ also completes a locking path for relay U2 from ground on lead CGL through contacts UZ–4, U3–4 and U2–1. Five message units have now been counted by the units counter UC, as represented by the operated relays U2 and U3.

In the event that the duration of the present call exceeds the first overtime period, a second overtime period begins and a third message unit pulse is sent to operate relay PD as previously explained. Operated relay PD then shunts down relay UW by reapplying ground through contacts PD–1, MS–4, UW–5, UZ–5, U3–5 and U6–2, lead PU and contact UZ–6 to the right-hand winding of relay UW. Relay UW thereupon releases and closes contact UW–2 to complete a path for holding relay UZ operated under control of the ground on lead PU. The release action of relay UW also completes a circuit for operating relay U6 of FIG. 3. This circuit is from potential P5 through the winding of relay U6, contacts U3–6, U2–2 and UW–6 to ground on lead CGL. Upon operating, relay U6 locks via contact U6–3 to ground on lead CGL.

When potential P3 is removed from lead M at the end of the third message unit pulse, relay PD releases and opens at contact PD–1 the previously described holding path for relay UZ which then releases. The release of relay UZ opens contact UZ–4 for causing the release of relays U2 and U3. Six message units have now been counted by counter UC, as represented by the operated relay U6.

If a call duration exceeds the second overtime period, a third overtime period is started and a fourth message unit pulse is sent to operated relay PD over the previously described path. Relay PD then recloses the aforementioned operating circuit for relay UW. Upon operating, relay UW again locks through contact UW–3 to ground on lead CG. Operated relay UW, in turn, effects the operation of relay U1 over the path from ground on lead CGL through contacts UW–4, U3–7 and U2–6, and the winding of relay U1 to potential P5.

At the end of the fourth message unit pulse, relay PD is released as previously explained, and opens contact PD–1 to disconnect the shunt-down ground from the previously traced path to the left-hand terminus of the winding of relay UZ and enabling relay UZ to operate again over the path through contact UW–3 to ground on lead CG. After operating, relay UZ completes a locking path from relay U1 through contacts U1–1, U3–8 and UZ–4 to ground on lead CGL. Counter UC has now counted seven message units, as represented by the operated relays U1 and U6.

A fifth message unit pulse is sent over the aforementioned path to re-operated relay PD when the duration of the call extends into a fourth overtime period. Upon re-operating, relay PD recloses contact PD–1 to shunt the winding of relay UW to ground, as previously explained, and thereby effects its release. Relay UW thereupon causes the re-operation of relay U2 over the path from ground on lead CGL via contacts UW–6, U3–9 and U1–3, and the winding of relay U2 to potential P5.

Relay PD again is released at the end of the fifth message unit pulse for re-opening, at contact PD–1, the aforementioned locking for relay UZ. The latter relay then releases and completes a path from ground on lead CGL through contacts UZ–1, U3–10 and U2–1 to the winding of relay U2 for locking the relay operated. At the same time, relay UZ opens at contact UZ–4 the locking path for relay U1 which then releases. Eight message units have now been counted by counter UC, as represented by the operated relays U2 and U6.

When the duration of the instant call exceeds the fourth overtime period, a fifth overtime period begins and a sixth message unit pulse is sent via trunk TK1 to operate relay PD, as previously described. Relay PD then causes the re-operation of relay UW over the path ground through contacts PD–1, MS–4, UW–1 and UW–2 to the winding of relay UW. When so operated, relay UW causes the operation of relay U3 over the path from the potential P5 through the winding of relay U3, contacts U2–3 and UW–4 to ground on lead CGL. Operated relay U3 opens at contact U3–10 the aforementioned locking path for relay U2 but, at the same time, closes another path for locking relay U2 to the ground on lead CGL through contacts UW–4, U2–3, U3–2, U6–4, U3–4 and U2–1.

At the end of the sixth message unit pulse, relay PD releases and opens contact PD–1 to remove the shunt-down ground applied to the winding of relay UZ via contacts MS–4, UW–1 and UZ–3 and thus enables relay UZ to operate as previously explained. The operation of relay UZ completes an auxiliary locking path for relay U2 to ground on lead CGL via contacts UZ–4, U3–4 and U2–1. The ground on lead CGL is further extended through contacts UZ–4, U6–4 and U3–2 to the winding of relay U3 for locking that relay. Nine message units have now been counted by counter UC, as represented by the operated relays U2, U3 and U6.

Before proceeding further with the description of the circuit operations that occur after the duration of the call exceeds the fifth overtime period, it is desirable to note that the tens digit counter TC of FIG. 3 comprises the same relay circuitry as the units counter UC, except that counter TC comprises the additional contacts TW–1, TW–2, TZ–1 and TZ–2 of relays TW and TZ (not shown) serially connected between leads CG and CGL. Lead PT to counter TC corresponds circuitwise to the lead PU to the counter UC. Leads UL1 and UL3 of the counter UC have no counter part in the counter TC. Relays T1–T6 (not shown) of counter TC correspond circuitwise to the relays U1–U6. Similarly, relays TW and TZ (not shown) of counter TC correspond circuitwise to relays UW and UZ. Relays TW, TZ and T1–T6 (not shown) are operated in response to ground pulses on lead PT in essentially the same manner as relays UW, UZ and U1–U6 are, in response to ground on lead PU.

Returning now to the description of the circuit operations, it is noted that, after the call duration exceeds the fifth overtime period, a sixth overtime period is initiated and office CO sends a seventh message unit pulse over trunk TK1 for operating relay PD. The latter relay, in turn, operates relay TW (not shown) of counter TC by applying ground through contacts PD–1, MS–4, UW–5, UZ–5, U3–5 and U6–5, lead PT, and a contact and the winding of relay TW (not shown) of counter TC. Operated relay TW (not shown) opens, at contact TW–1, the locking paths for relays U2, U3 and U6 and the latter relays release. Upon releasing, relay U3 shunts the right-hand terminus of the winding of relay UW to ground via contact UZ–6, lead PU, contacts U3–12, UZ–5, UW–5, MS–4 and PD–1. Released relay UW closes contact UW–2 to hold relay UZ operated to the ground applied via lead PU and contacts UW–1, MS–4 and PD–1. The operation of relay TW (not shown) also maintains ground on lead PT via contacts TZ–3, TW–3, UW–1, MS–4 and PD–1 after the release of relay UW. Relay TW (not shown) also causes the operation and locking of relay T1 (not shown) of counter TC over circuit paths similar to those described with respect to the operation of relay U1 upon the receipt of the fourth message unit pulse. Upon removal of the seventh pulse, relay PD releases opening contact PD1 to effect the release of relay UZ. Operated relay T1 (not shown) indicates a count of ten message units.

Subsequent message unit pulses may be received from office CO as long as the call continues. A total of 96 such pulses may be counted by counter UC and TC to indicate a total of 99 units including the three surcharge units. Counter TC counts every tenth unit message pulse received after the aforementioned seventh pulse, and counter UC counts each set of nine successive pulses preceding the tenth pulse. For example, each of the sets of nine message unit pulses receivable after the aforementioned seventh pulse activates the relays U1–U6 in the following sequence—

Pulse:                                  Relay(s) operated
1 ---------------------------------------- U1
2 ---------------------------------------- U2
3 ---------------------------------------- U3
4 ---------------------------------------- U1–U3
5 ---------------------------------------- U2–U3
6 ---------------------------------------- U6
7 ---------------------------------------- U1, U6
8 ---------------------------------------- U2, U6
9 ---------------------------------------- U2, U3, U6

Similarly, each tenth pulse following the aforementioned seventh pulse from office CO causes the operation of relays T1–T6 according to the following sequence—

Pulse:                                  Relay(s) operated
17 ---------------------------------------- T2
27 ---------------------------------------- T3
37 ---------------------------------------- T1, T3
47 ---------------------------------------- T2, T3
57 ---------------------------------------- T6
67 ---------------------------------------- T1, T6
77 ---------------------------------------- T2, T6
87 ---------------------------------------- T2, T3, T6

*Trunk circuit seizure of a registration and control circuit*

Trunk circuit TC1 initiates the seizure of an available one of the registration and control circuits RC1 or RC2 of FIGS. 4, 5, 6 and 7 and after either 99 message units have been assessed by counters UC and TC or the caller or called party has disconnected. One of the circuits RC1 or RC2 is seized after 99 message units have been assessed in order that a record of the message units chargeable against station GS0000 may be recorded. This is necessary because the counters UC and TC automatically recycle upon the receipt of the 97 message unit pulse from office CO.

The seizure is initiated in circuit TC1 by operating relay ST of FIG. 2. After 99 message units have been assessed, relay ST is operated over the path from the negative potential P8 through the winding of relay ST, contacts U3–U13, U6–6, T6–1, T3–1, PD–3 and SR–2, lead STL, contacts UZ–7 and UW–8, lead CGL, contacts TW–2 and TZ–2, lead CG and contact C–1 to ground. When either the caller or called parties disconnects, an operate path for relay ST is completed from ground through either contact SR–3 or S–2 and the winding of relay ST to potential P8. Contact SR–3 is actuated to complete the latter path after relay SR is released in the usual manner following the called party disconnect. Similarly, contact S–2 closes the path after relay S releases following the calling party disconnect.

Upon operating, relay ST completes its locking path through contacts ST–1 and C–1 to ground. At the same time, relay ST holds the connections through network SN between the calling line L0 and trunk circuit TC1 in the conventional way by applying ground to the sleeve lead TS1 of FIG. 2 via contacts ST–2 and C–2. These connections are held in order that the calling station GS0000 may be identified as hereinafter explained.

Figure 4:
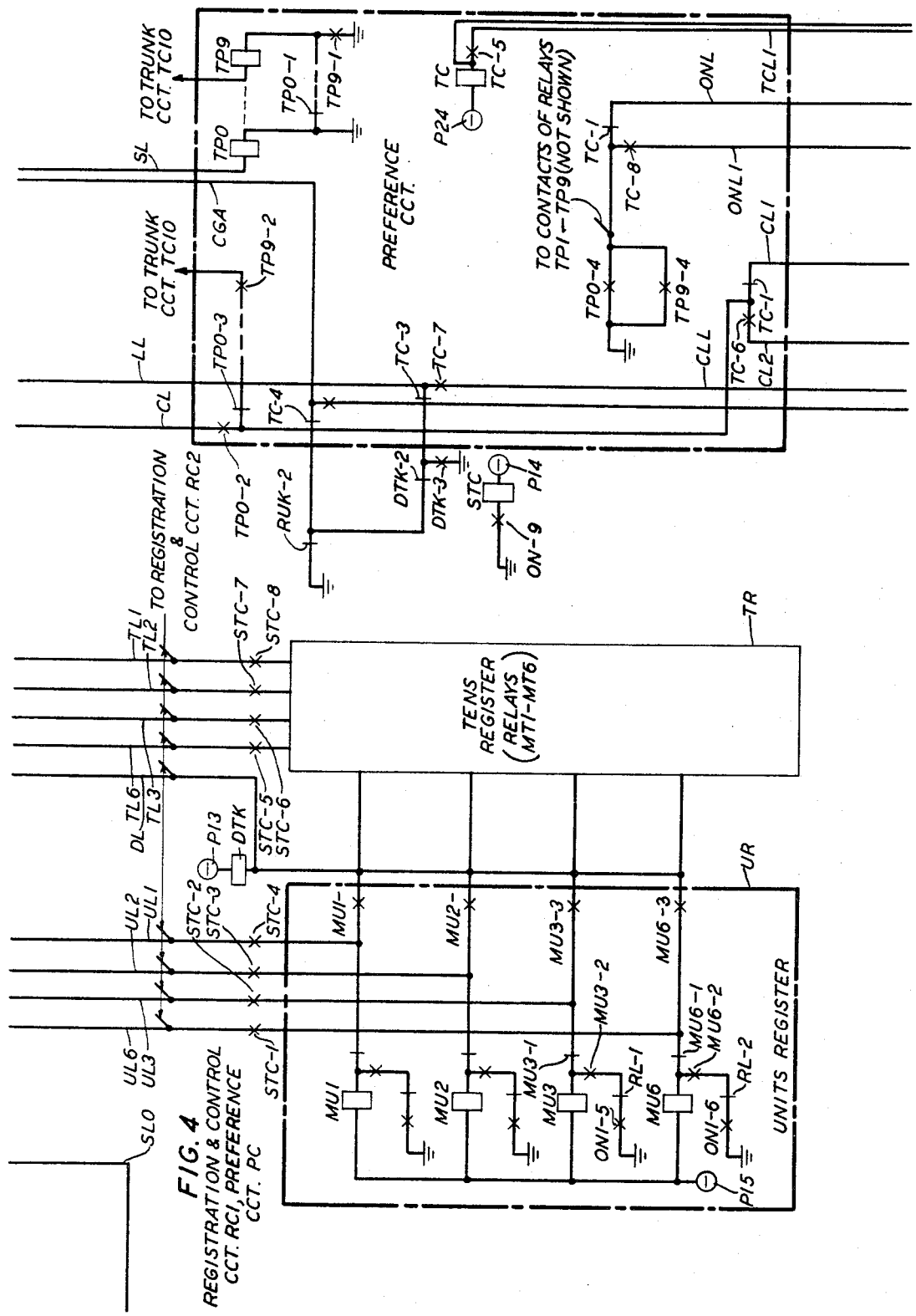

Operated relay ST also completes a path for operating the relay TPO in the preference circuit PC of FIG. 4. This path is from a negative potential P9 of FIG. 2 through contacts S–3 or SR–4 and ST–3, start lead SL and the winding of relay TPO to ground. After operating, relay TPO opens contact TPO–1 to disconnect the operating ground for the other relays TP–, such as TP9 of circuit PC. Circuit TC1 is thus given preference over the other circuits TC2–TC10 for service by an available one of the registration and control circuits RC1 or RC2.

At this point, it is advisable to explain that circuits RC1 and RC2 are structurally the same and that only those circuit details of these circuits which are necessary for a complete understanding of the invention are shown in FIGS. 4–7. Circuits RC1 and RC2 are made available for serving trunk circuits TC1–TC10 under control of the transfer control relay TC in the circuit PC of FIG. 4. This relay has contacts in strategic control paths of the registration and control circuits RC1 and RC2 to control which one of them will be seized by a trunk circuit. Initially, relay TC is released and thereby makes circuit RC1 available for serving one of the circuits TC1 and TC10 as hereinafter explained. After it has served one of the circuits TC1–TC10, circuit RC1 operates relay TC and thereby makes circuit RC2 available and circuit RC1 unavailable for serving the next trunk request. Relay TC is again released to make circuit RC1 available and circuit RC2 temporarily unavailable for serving another trunk request after circuit RC1 has served a trunk circuit.

Figure 5:
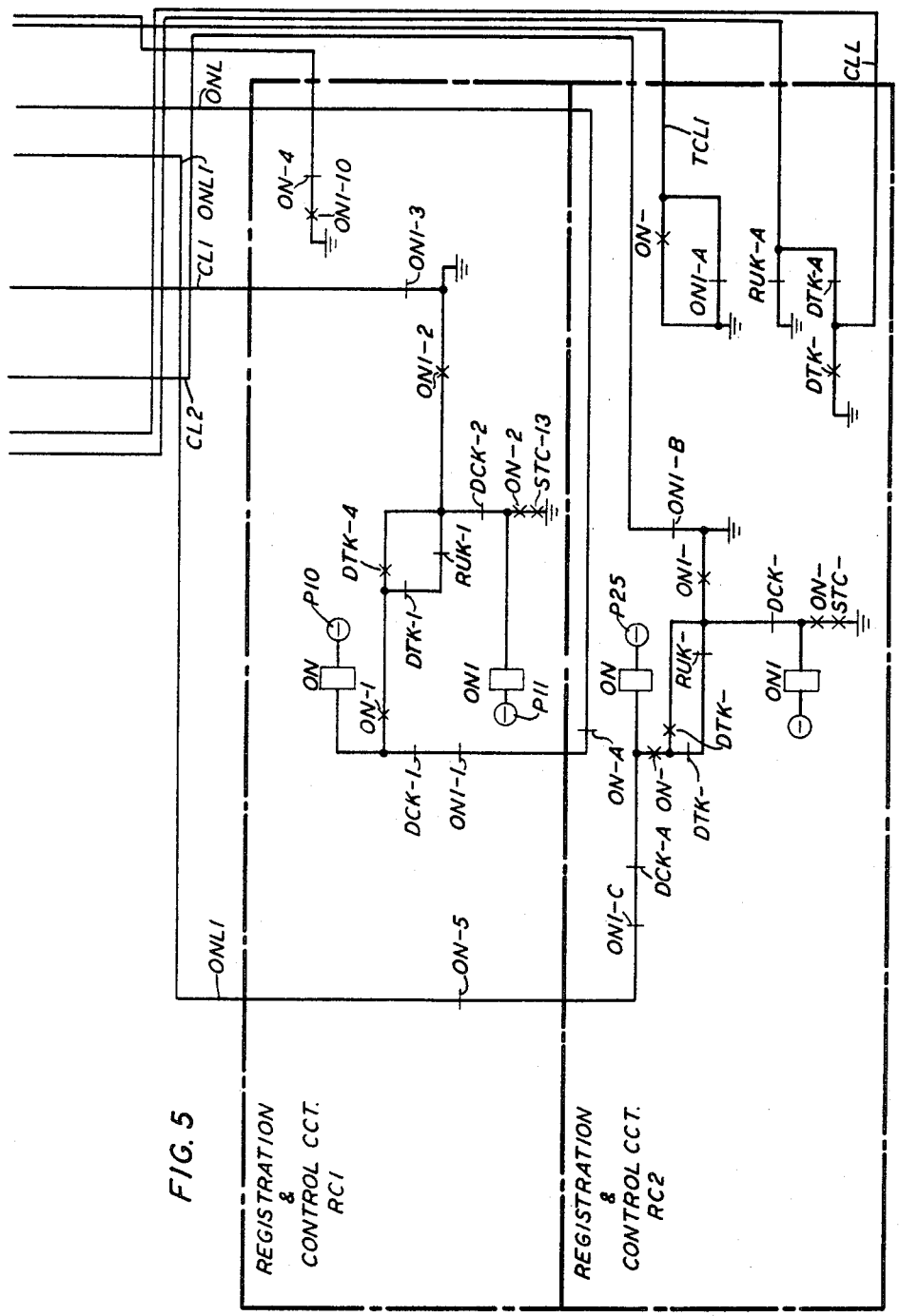

Assuming now that relay TC is released and circuit RC1 is available for serving trunk circuit TC1, it is noted that when relay TPO operated, as previously explained, it operates the off-normal relay ON in circuit RC1 of FIG. 5 over the path from the negative potential P10 through the winding of relay ON, contacts DCK–1, ON1–1 and ON–A of circuit RC–2, lead ONL, and contacts TC1 and TPO–4 to ground. Relay ON then locks operated via contacts ON–1, DTK–1, RUK–1, DCK–2 and ON–2 to ground. Relay ON completes the operate path for the relay STC of circuit RC1 from ground through contacts ON–9 and the winding of relay STC to the negative potential P14. Relay ON1 now operates from the negative potential P11, through the winding of relay ON1, contacts ON1–2 and STC–13 to ground and at the same time provides an auxiliary locking path for relay ON of circuit RC1.

Before relay ON1 of circuit RC1 operates, relay TPO closes a path at contact TPO–2 for operating the connector relay C of FIG. 2 and opens the operate path for the corresponding C relays in the other trunk circuits TC2–TC10 (not shown) at contact TPO–3 to prevent double connections between circuits TC1–TC10 and RC1. Relay C of circuit TC1 operates over the path from the negative potential P12 of FIG. 2 through the winding of relay C, contact ST–4, lead CL, contacts TPO–2 and TC–1, lead CL1 and contact ON1–3 to ground. Upon operating, relay C locks via contacts C–3, lead LL, contacts TC–3, DTK–2 and RUK–2 to ground. Before relay C opens contact C–1 to disconnect ground from lead CG of FIG. 2, it applies a substitute ground thereto via contact C–4, lead CGA and contacts TC–4 and RUK–2 for holding the operated ones of relays MU1–MU6 nd MT1–MT6 (not shown) operated in counters UC and TC. Operated relay C also causes the operation of relay DTK of FIG. 4 over the path from the negative potential P13 through the winding of relay DTK, lead DL and contacts C–5 and ST–5 to ground.

Before proceeding with the description of the circuit operations that occur following the operation of relay ON of circuit RC1, it is noted that the units and tens digit registers UR and TR of FIG. 4 comprise the same relay circuitry and that the register TR is shown in block diagram form to simplify the circuit drawing. Specifically, relays MU1–MU6 of register UR correspond to the relays MT1–MT6 (not shown) of register TR.

The operation of relay STC completes paths between trunk circuit TC1 and the registers UR and TR through contacts STC–1 to STC–8 for operating certain of the relays MU1–MU6 and MT1–MT6 (not shown) to register the number of message units assessed by counters UC and TC of FIG. 3. Relays MU1–MU6 and MT1–MT6 (not shown) are operated in accordance with the following table to register the indicated numbers as the units and tens digits:

| Tens digit | Relay(s) operated | Units digit | Relay(s) operated |
|---|---|---|---|
| 0 | None. | 0 | None. |
| 1 | MT1. | 1 | MU1. |
| 2 | MT2. | 2 | MU2. |
| 3 | MT3. | 3 | MU3. |
| 4 | MT1, MT3. | 4 | MU1, MU3. |
| 5 | MT2, MT3. | 5 | MU2, MU3. |
| 6 | MT6. | 6 | MU6. |
| 7 | MT1, MT6. | 7 | MU1, MU6. |
| 8 | MT2, MT6. | 8 | MU2, MU6. |
| 9 | MT3, MT6. | 9 | MU3, MU6. |

To illustrate, when the counters UC and TC have counted 99 message units, the relays MU3, MU6, MT3 (not shown) and MT6 (not shown) are operated. The operate path for relay MU3 is from the negative potential P15 of FIG. 4 through the winding of relay MU3, contacts MU3–1, STC–2, lead UL3 and contacts C–7 and U3–14 to ground. Relay MU3 then locks operated through contacts MU3–2, RL–1 and ON1–5 to ground. After operating, relay MU3 activates contact MU3–1 to isolate its operating path from its locking path. At the same time, relay MU3 provides a locking path for relay DTK via contacts MU3–3 and STC–2, lead UL3, and contacts C–7 and U3–14 to ground. The operate path for relay MU6 is from the negative potential P15 through the winding of relay MU6, contacts MU6–1 and STC–1, lead UL6, and contacts C–6 and U6–7 to ground. Upon operating, relay MU6 locks via contacts MU6–2, relay RL–2 and ON1–6 to ground. Relay MU6 also provides an auxiliary locking path for relay DTK via contacts MU6–3 and STC–1, lead UL6 and contacts C–6 and U6–7 to ground. The operating and locking paths for relays MT3 and MT6 (not shown) of register TR are essentially the same as described for relays MU3 and MU6.

While the message units are being registered in registers UR and TR, other circuit operations are initiated by relay C of FIG. 2 in order to identify station GS0000. Before explaining these operations, however, it is advisable to describe certain features of the identifier circuit IC of FIG. 6. For the exemplary embodiment of this invention, circuit IC comprises the 200-sleeve relays SR00–SR199. Each of these relays, such as relay SR00, is connected through ten diodes, such as the diodes D00–D09 of the diode package DP–1, to the sleeve leads, such as lead SL0, of a group of ten customer lines, such as lines L0–L9. The sleeve lead, such as lead SL0, of each customer line is also connected through a contact, such as contact SR00–1, of its associated relay SR––, such as relay SR00, to one of the units digit leads UD0–UD9 for applying a positive potential to the registration and control circuits RC1 and RC2 as described hereinafter, to indicate the "units" digit of the calling station.

For identifying the "tens" digit of a calling station, each of the sleeve leads SL0–SL1999 is further extended through one of the diodes D00–D1999, a contact of the associated one of the relays SR00–SR199 and the "tens" cross-connection field between the terminal TT00–TT199 and T0–T9 to the windings of the "tens" block relays TB0–TB9. In this exemplary embodiment, each of the terminals T0–T9 is cross-connected to all of the TT00–TT199 terminals which have the same last digit. For example, terminal T0 is cross-connected to the terminals TT00 and the other terminals TT10, TT20, TT30, etc. to TT190, which are not shown in the drawing. Contacts TB0–1 to TB9–1 of FIG. 6 are arranged for supplying ground potential over the "tens" digit leads TD0–TD9 to the registration and control circuits RC1 and RC2 to indicate the identity of the underlined "tens" digit of the stations GS0000–GS1999.

The underlined "hundreds" and "thousands" in digits of the customer stations CS0000–CS19999 are supplied to circuits RC1 and RC2 by applying ground potential through contacts SR00–3 to SR199–3 to leads HD0–HD9 via terminals HT0–HT199 and H0–H9, and through contacts SR00–4 to SR199–4 to leads THD0–THD1 via terminals THT0–THT199 and TH0–TH1. Each of the terminals H0–H9 is cross-connected to ten consecutively numbered ones of the terminals HT0–HT199. To illustrate, terminal H0 is cross-connected to the ten terminals HT0–HT9 to indicate the first hundred stations GS0000–GS0099 and similarly, terminal H1 (not shown) is cross-connected to terminals HT10–HT19 (not shown) to indicate the second hundred stations GS0100–GS0199 (not shown). The "thousands" terminals TH0 is cross-connected to the terminals THT0–THT99 (not shown) to indicate the "thousands" digit for the first thousand stations GS0000–GS0999. Terminal TH1 is cross-connected to terminals HT100 (not shown) to HT199 to indicate the "thousand" digit for stations GS1000–GS1999.

Figure 6:
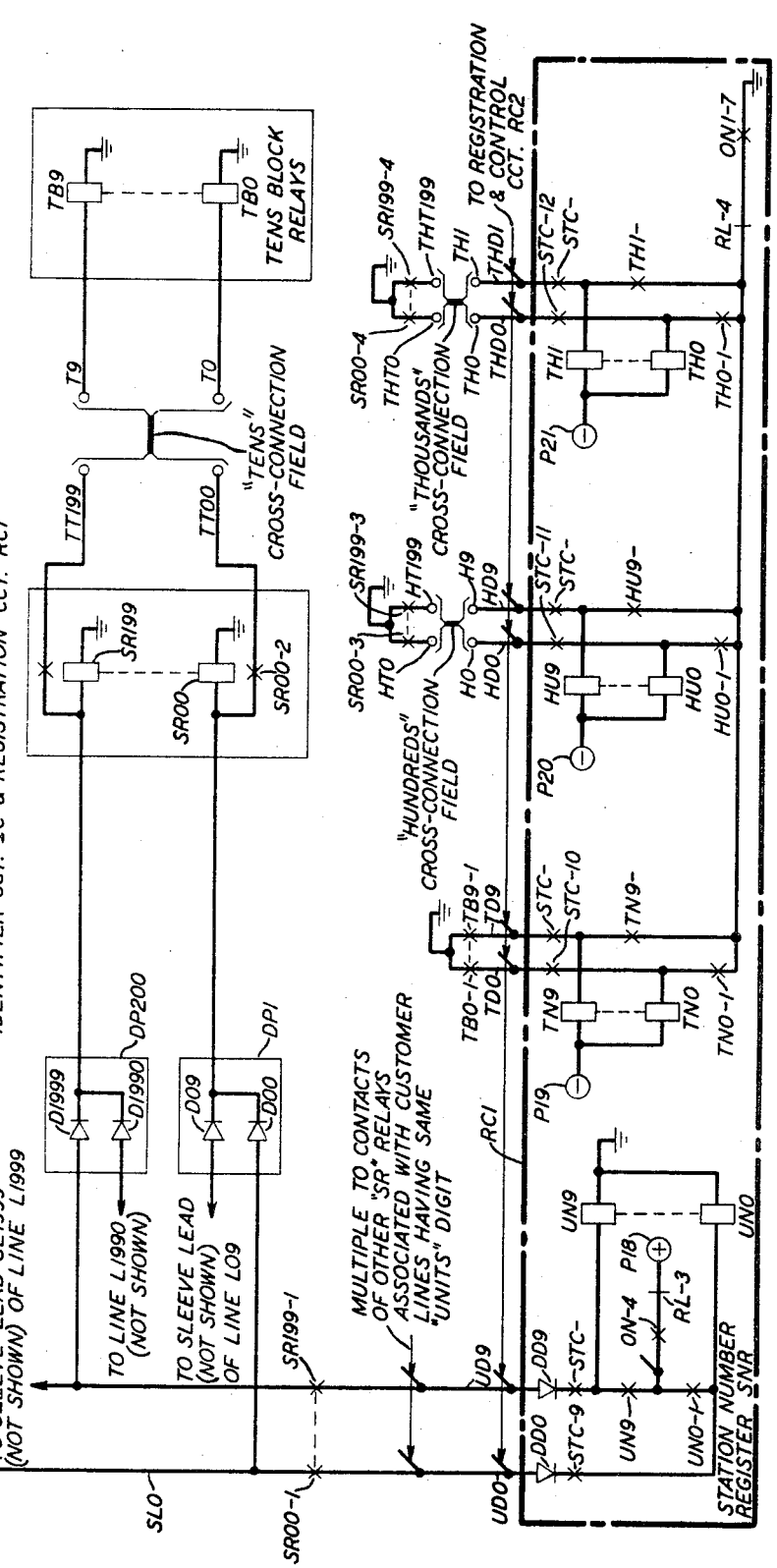

Returning now to the description of the circuit operations, it is noted that when relay C of FIG. 2 operated, as previously stated, it initiates the identification of the station GS0000 by completing the circuit for operating relay SR00 of FIG. 6. This circuit is from the positive potential P16 of FIG. 2 through the thermal resistor TR, contact C–14, sleeve lead TS1, network SN, lead SL0, diode D00 and the winding of relay SR00 to ground. The positive potential on lead TS1 also holds the connections through network SN between station GS0000 and circuit TC1. This potential also biases the diode D of FIG. 3 to its high impedance state to isolate potential P16 from the ground applied through contact ST–2.

Upon operating, relay SR00 completes the circuit for operating the units digit relay UN0 in the station number register SNR of circuit RC1 (FIG. 6) and thereby registers the "units" digit of station GS0000. The latter circuit is from the positive potential on lead SL0 through contact SR00–1, lead UD0, diode DD0, contact STC–9 and the winding of relay UN0 to the ground. Relay UN0 then operates and locks via contacts UN0–1, ON–4 and RL–3 to the positive potential P18.

Relay SR00 also causes the operation of relay TB0 of FIG. 6 over the path from ground through the winding of relay TB0, cross-connections (not shown) between terminals T0 and TT00, contact SR00–2 and diode D00 to the positive potential on lead SL0. Relay TB0 in turn causes the operation of relay TN0 of FIG. 6 to register the underlined "tens" digit 0 of the customer station GS0000 in circuit RC1. The operate circuit for relay TN0 is from the negative potential P19 through the winding of relay TN0, contact STC–10, lead TD0 and contact TB0–1 to ground. Relay TN0 upon operating locks to ground via contacts TNO–1, RL4 and ON1–7 to ground.

Relay HU0 of FIG. 6 is activated by relay SR00 to register the underlined "hundreds" digit of station GS0000. The activating path is from ground through contact SR00–3, cross-connections between terminals HT0 and H0, contact STC–11 and the winding of relay HU0 to the negative potential P20. After operation HU0 then locks through contacts HU0–1, RL–4 and ON1–7.

In a similar fashion, relay TH0 is operated by relay SR00 to register the underlined "thousands" digit of station GS0000 in circuit RC1. The operate path is from ground through contact SR00–4, cross-connections between terminals THT0 and TH0, contact STC–12 and the winding of relay TH0 to the negative potential P21. Operated relay H0 locks via contacts TH0–1, RL4 and ON1–7 to ground. After the number of station GS0000 has been registered in circuit RC1, the registration check relay RUK of FIG. 7 is activated in the circuit comprising a configuration of contacts of the relays MT1–MT6 (not shown), MU1–MU6, TH0–TH1, HU0–HU9, TN0–TN9 and UN0–UN9. This configuration checks the validity of the registrations of the station number in station number register SNR and the chargeable message units in registers UR and TR by insuring that relay RUK is operated only if: none, one or two of the relays MT1–MT6 (not shown) are operated; none, one or two of the relays MU1–MU6 are operated; one of the relays TH0–TH1 is operated; and only one relay of each of the groups of relays HU0–HU9, TN0–TN9 and UN0–UN9 is operated. The contact configuration of the relays MT1–MT6 (not shown) represented by block MT of FIG. 7 is structurally the same as the contact configuration of the relays MU1–MU6 shown schematically in block MU in FIG. 7. Similarly, the contact configuration of relays HU0–HU9 shown schematically in block HU of FIG. 7 is structurally the same as the contact configurations of relays TN0–TN9 and UN0–UN9 represented as blocks TN and UN in FIG. 7. The activating circuit for relay RUK is from the negative potential P22 through the winding of relay RUK, contacts RL5, RL6, UN0 to UN9 (not shown) of block UN, RL7, TN0 to TN9 (not shown) of block TN, RL8, HU9–1 to HU1–1 and HU0–2 of block HU, RL9, TH–1, TH0–2, RL18, MU6 to MU1 of block MU, MT1 to MT6 (not shown) of block MT and DTK–6 to ground.

When relay RUK operates, a momentary ground is applied to lead SCP via contacts STK–1 and RUK–3 for starting the operation of the card perforator CP1. Thereafter, when perforator CP1 is prepared to receive the registered numbers from circuit RC1, ground is supplied to lead CKL in the circuit through the winding of relay STK to the negative potential P23. Relay STK then operates and locks via contacts STK–2 and ON1–9 to ground. At approximately the same time, perforator CP1 begins to apply ground (not shown) in succession to each of the leads A–F to read out the registered station number and chargeable number of message units via the contact configurations depicted in blocks UNA, TNA, HDA, THA, MUA and MTA. The contact configuration depicted in block UNA of FIG. 7 comprises contacts of relays UN0–UN9 and is structurally the same as contact configuration in each of the blocks TNA and HDA which comprise contacts of relays TN0–TN9 and HD0–HD9. The contact configuration of block MUA comprises contacts of relays MU1–MU6 and is structurally the same as the contact configuration of block MTA which comprises contacts of relays MT1–MT6 (not shown).

As the perforator CP1 receives the read out numbers over the read out conductors ROCA–ROCF or cable ROC, it perforates a card (not shown) in the usual manner to record the registered station number and the number of mesage units chargeable against that number. After the card (not shown) is perforated, it is stored by the other data processing facilities of equipment DPE for subsequent processing at the time the guest desires to have his check-out bill.

After relay RUK operated and while the perforator is reading out the registered message units and station numbers, the previously traced locking paths for relays ST of FIG. 2, and UW, UZ, TW and TZ (not shown), U1–U6 and T1–T6 (not shown) of FIG. 3, are opened at contact RUK–2 of FIG. 4 and the latter relays released.

The combined release actions of relays ST and the operated ones of relays U1–U6 and T1–T6 (not shown) also open the previously traced operate path for relay DTK of FIG. 4 and thereby causes its release. Upon releasing, relay DTK opens the locking path for relay C of FIG. 2 at contacted DTK–3. Relay C then releases and opens contact C–14 to disconnect the postive potential P16 from the operate circuit of relay SR00 of FIG. 6. Thereupon, relay SR00 releases and in turn opens contact SR00–2 to release relay TB0. The identifier is thus returned to its idle condition.

Relay ON of circuit RC1 of FIG. 5, also releases when its locking path is opened by contact DTK–4 upon release of DTK. The release action of relay ON completes the operating path for the transfer control relay TC of FIG. 4, which is from the negative potential P24 through the winding of relay TC over lead TCL, contacts ON4 and ON1–10 to ground. Upon operating, relay TC locks through contacts TC5, lead TCL1 and contact ON1–A of the registration and control circuit RC2.

Released relay ON causes the release of relay ST6 which opens the operate circuits for the operated ones of relays MU1–MU6, MT1–MT6 (not shown), and relays UN0, TN0, HU0, and TH0; however, these relays remain operated by virtue of their aforementioned locking paths in order that perforator CP1 may complete the read out operation. Circuit RC2 is then made available for serving one of the trunk circuits TC2–TC10 (not shown).

When relay ST released as previously explained, it opened the operate circuit for relay TP0 of FIG. 4 at contact ST–3. Relay TP0 then releases and recloses contact TP0–1 for reconnecting the operate ground to the windings of the relays TP1–TP9. Thereafter, one of the trunk circuits TC2–TC10 (not shown) is able to operate its associated one of the relays TP1–TP9 to seize the registration and control circuit RC2 to effect the production of a card record of a call. To illustrate, assume that circuit TC10 bids for circuit RC2. In doing so, circuit TC10 applies a negative potential (not shown) to the winding of relay TP9 of FIG. 4 to operate that relay over the obvious path if none of the relays TP1–TP8 (not shown) is operated. Upon operating, relay TP9 locks operated through contact TP9–1. At the same time, the connector relay (not shown) in circuit TC10 (not shown), which corresponds to relay C of FIG. 2, is operated over the path from ground through contact ON1–B of circuit RC2 of FIG. 5, lead CL2, contacts TC6, TP0–3, TP1 to TP8 (not shown) and TP9–2 and the winding of the connector relay (not shown). The latter relay locks operated under control of the ground applied to its winding (not shown) from circuit RC2 through contacts RUK–A and DTK–A, lead CLL, contact TC7 and lead LL. Operated relay TP9 also completes an operating circuit for relay ON in circuit RC2 of FIG. 5. This path is from the negative potential P25 through the winding of relay STC (not shown) contacts DCK–A and ON1–B of circuit RC2, contact ON–5 of circuit RC1, lead ONL1, and contacts TC8 and TP9–4 to ground. Upon operating, relay ON of circuit RC2 operates relay ON1 over the obvious path in circuit RC2. The combined operation of relays ON of circuit RC2 closes an auxiliary locking path for the transfer control relay TC of FIG. 4 to hold that relay operated until after circuit RC2 has completed the registration of a station number and the chargeable message units in a manner similar to that described with respect to circuit RC1. The operations of circuit RC2 that follow after the operation of its relays ON and STC (not shown) are essentially the same as those hereinbefore described with respect to the circuit RC1. After the registration of a station number and a number of chargeable units in message RC2, relay ON of that circuit is released to open the locking path of TC. The latter relay then releases in order to make circuit RC1 again available to cooperate with the next bidding trunk circuit for producing a card record.

After the card has been perforated to record the charge data for the call between station GS0000 and CS, perforator CP1 operates the release relay RL by momentarily applying ground to the circuit of winding RL to potential P23. Relay RL then locks via contacts RL11 and ON1–9 to ground. Upon operating, relay RL opens at contacts RL3 and RL4 the aforementioned locking paths for relays UN0, TN0, HU0, and TH0 of FIG. 6 and the operated ones of the relays MU1–MU6 and MT1–MT6 (not shown) which then release. Thereupon, a path is completed for operating the down-check relay DCK of FIG. 7 to initiate the release of relay RC1. This path is from the potential P22 through the winding of relay DCK, contacts RL12 and RL13, break contacts (not shown) in block UN, contact RL14, break contacts (not shown) in block TN, contact RL15, contacts HU9–2 to HU1–2 and HU0–3 in block HU, contact RL16, contacts TH1–2 and TH0–3 in block TH, contact RL17, lead F, break contacts of relays MT1–MT6 (not shown) of block MTA, contact RL18, lead E, break contacts of relays MU1–MU6 in block MU and contact RL19 to ground. The operation of relay DCK also opens the locking path for relay ON1 of circuit RC1 at contact DCK–2. Relay ON1 then releases and opens the locking circuits for relays STK and RL to release these relays. Relay RL in turn releases relay DCK and thus completes one cycle of the operations of circuit RC1. The latter circuit then is in its idle condition and prepared to serve another trunk circuit after circuit RC2 has served one of the trunk circuits TC2–TC10 (not shown) as previously indicated.

If trunk circuit TC1 is yet engaged in serving the call between station GS0000 and CS and the aforementioned operations of circuit RC1 were concerned with the production of a card record of the 99 message units chargeable against station GS0000, relays S and SR of FIG. 2 remain operated and, in turn, hold relay MS of FIG. 3 operated. Accordingly, if the call continues beyond the 95th overtime period, a 97th message unit pulse will be sent from office CO of FIG. 2 over lead M to operate relay PD in a manner as previously explained. This pulse, however, will only cause a count of one to be registered in counter UC. No surcharge is added to the count upon the receipt of this pulse. After operating, relay PD causes the operation of relay UW over the path from ground through contacts PD–1, MS–4, UW–1, UW–2, the winding of relay UW and resistor R1 to potential P7. The latter relay, in turn, causes the operation of relay U1 of FIG. 3 to register the count of one message unit over the path from potential P5 through the winding of relay U1 and contacts U2–6, U3–7, UW–4 to the ground on lead CGL.

The other circuit operations that occur for counting succeeding message unit pulses, such as the 98th pulse, are essentially the same as those described hereinbefore. Finally, when the caller or called party has terminated the call and disconnected, the relays S and SR are released to initiate other circuit operations in a manner as previously explained to cause the production of a card record of the number of the called stations GS0000 and the message units counted after the initial 99 message units.

While our invention has been disclosed with reference to particular charging and billing circuits in conjunction with a private branch exchange, it may be noted that various component substitutions are permitted. For example, electronic pulse counters may be utilized in place of the relay counters described hereinbefore. The counting capacity of such counters may also be reduced or extended as the individual installation requires. To illustrate, the counters may be arranged to count twenty or thirty periods instead of the ninety-seven periods as in the illustrative embodiment. This would further reduce the cost of the relay counters, for instance, by eliminating certain relays in the tens counter.

In addition, a single data processing system may be arranged to serve a plurality of different business establishments by providing signaling facilities therebetween in a manner as known in the art. Also, the card perforators may be replaced by various forms of recording devices, such as tape recorders and the like, to provide for the recording of the identity of calling stations and the message units chargeable to those stations.

Moreover, it is noted that the invention may be incorporated into a conventional telephone office, wherein the customer lines are extended directly to the office through line circuits, such as trunk circuits TC1–TC10, without passing through a PBX switching network, for automatically charging and billing customers on a message rate basis.

It is to be understood that the above-described arrangements are illustrative of the application of the principles of the invention. In light of this teaching, numerous other arrangements may be devised by those skilled in the art without departing from the spirit and scope of the invention.

What is claimed is:

1. In a switching system having means for interconnecting calling and called customer stations on a message rate charge basis, a counter responsive to each message unit signal received during a call for counting the message units for said call, an identifier operable upon the termination of said call for identifying the number of the calling station, and means activated by both said counter and identifier for producing a record of the counted message units and the identified station number.

2. In a switching system in accordance with claim 1 the combination wherein said counter comprises means responsive to the receipt of one of said signals for adding a number of message units to said message unit counting as a surcharge for said call.

3. In a switching system in accordance with claim 1 the combination wherein said counter comprises means operated when said counter has counted a predetermined plurality of message units before the end of said call for operating said identifier to identify said calling station number and said producing means to produce a special record of said plurality of message units and said identified station number.

4. Equipment for a switching system having means for establishing call connections between calling and called lines, comprising a counter responsive to each message unit pulse received during a call for counting the message units for said call, means responsive to the receipt of the first message unit pulse for adding a number of message units to the message unit count as a surcharge, means activated upon the termination of said call for applying a marking signal to said calling line, an identifier responsive to the receipt of said marking signal from said calling line for identifying the calling line number, a register, control circuits for selectively controlling the connection of said register to said counter and identifier to register the counted number of message units and the identified line number, and recording means activated for recording the registered numbers.

5. In a private branch switching system, a plurality of station lines, a plurality of trunk circuits extending to a telephone central office, switching means for connecting a calling one of said lines via a selected one of said circuits to a called station line via said office, said selected circuit comprising counting means responsive to message unit pulses received from said office during the call for counting the number of message units charged for said call and means activated upon the termination of said call for applying an electrical signal through said switching means to the calling line to hold the established connections and mark said calling line, an identifier activated for identifying the number of the marked line, a registration and control circuit connectable to said counting means and said identifier for registering the counted number of message units and the identified line number, and a recorder activated for recording said registered numbers.

6. In a private branch switching system in accordance with claim 5 the combination wherein said selected trunk circuit further comprises means for detecting each received message unit pulse, and said counting means comprises a counter activated by said detecting means for counting each units digit of the message units chargeable for said call and another counter for counting each tens digit of the message units chargeable for said call.

7. In a private branch switching system in accordance with claim 6 the combination wherein said selected trunk circuit further comprises means controlled by the first received message unit pulse for cooperating with said pulse detecting means to activate said units digit counter to add a plurality of message units to the charge count as a surcharge for said call.

8. In a private branch switching system in accordance with claim 7 the combination wherein said units and tens digit counters comprise means operated after said counters have counted a predetermined number of message units for activating said signal applying means to apply said electrical signal through said switching means to said calling line for holding the established connections and marking said calling line, said identifier activated for identifying the number of the marked line, said registration and control circuit connectable to said units and tens digit counters and said identifier for registering the counted number of message units and the identified line number, and said recorder activated by said registration and control circuit for producing a special record of said last-mentioned numbers.

9. In a private branch switching system in accordance with claim 8 the combination wherein said selected trunk circuit further comprises means for recycling said units and tens digit counters to count the message units assessable for said call after said special record has been made.

10. In a private branch switching system in accordance with claim 9 the combination wherein said selected trunk circuit further comprises means for blocking the addition of any surcharge units for said call after said units and tens digit counters have been recycled.

11. A switching system including a plurality of customer lines, a plurality of trunk circuits, switching equipment for establishing call connections from the calling lines via said circuits to the called lines on a message rate charge basis, each of said circuits comprising a counter responsive to each message unit pulse received during a call for counting the number of message units charged for said call, means responsive to the receipt of the first message unit pulse for operating said counter to add a number of extra message units to the charge count as a surcharge, means activated upon the termination of said call for holding the established connections to the calling line and means for applying a signal through the held connections to mark said calling line, means for identifying the number of said marked line, a pair of registration and control circuits, a preference circuit responsive to a request signal received from any one of said trunk circuits at the end of a call for associating an available one of said registration and control circuits with said one trunk circuit and said identifying means, means in the associated registration and control circuit for registering the number of counted message units received from said one trunk circuit and the identified calling line number, and means for recording the registered numbers.

12. A switching system in accordance with claim 11 wherein said preference circuit comprises apparatus operative under the control of both of said registration and control circuits for making said last-mentioned circuits alternately available for connection to requesting trunk circuits and said identifier, and means for controlling the order of preference in which requesting trunk circuits are connected to an available one of said registration and control circuits.

13. In a telephone system, a plurality of station lines, at least one trunk circuit, switching equipment for establishing call connections from a calling station via one of said lines and said circuit, said circuit comprising counting means responsive to timed signals received at periodic intervals during a call for counting the message units for said call, means responsive to the receipt of one of said signals for operating said counting means to add a surcharge to the message unit count, holding means activated upon the termination of said call for applying a potential to said equipment to hold the call connections to the calling station and marking means for applying a potential through the held connections to said calling line, an identifier responsive to the receipt of said marking potential from said calling line for identifying the number of said calling station, a message unit register for registering the message units counted by said counting means, a station number register for registering the identified station number, means activated by said registers for sequentially reading the registered message units and station number, and a perforator operated by said reading means for perforating a record of the read message units and station number.

14. In a telephone system in accordance with claim 13, the combination wherein said call connections include a sleeve conductor extending from said trunk circuit through said switching equipment to said calling line, said holding means applies said holding potential to said switching equipment via said conductor, said marking means applies said marking potential to said calling line via said conductor, and said trunk circuit further comprises a unidireactional conducting device for isolating said holding potential from said marking potential.

15. In a telephone system in accordance with claim 14, the combination wherein said calling station has a multidigit identity number, and said identifier comprises a diode and a sleeve relay connected via said diode to said sleeve conductor, said relay being responsive to the receipt of said marking potential for controlling the identification of said calling station number.

16. In a telephone system in accordance with claim 15, the combination wherein said multidigit identity number comprises units, tens, hundreds and thousands digits; and said identifier further comprises a set of said contacts actuated by said sleeve relay for controlling the identification of the units, hundreds and thousands digits of said calling station number, and another relay connected to said sleeve conductor via a make contact of said sleeve relay and said diode, said other relay being activated upon the receipt of said marking potential for actuating its contact-springs to control the identification of the tens digit of said calling station number.

17. In a telephone system in accordance with claim 16, the combination wherein said station number register comprises a group of register relays and a rectifying device, one of said register relays connected through said rectifying device and a contact of said sleeve relay to the sleeve conductor of said calling line and operated upon the receipt of said marking potential for registering the units digit of said calling station number, another of said register relays operated upon the actuation of said contact-springs for registering the tens digit of said calling station number, and a pair of register relays operated upon the actuation of contacts of said sleeve relay for registering the hundreds and thousands digits of said calling station number.

18. In a telephone system in accordance with claim 17, the combination wherein said message unit register comprises a group of relays, and said reading means comprises circuitry for sequentially applying a signal through an array of contacts of said relays in said message unit register and said station number register to said perforator for effecting the perforation of a card record of said counted message units and calling station number.

19. Equipment for providing recorded message unit and line number data to a data processor for translation into bills for calls and comprising in a switching system having means for establishing call connections between calling and called lines, a counter responsive to each message unit pulse received during a call for counting the message units for said call, means activated upon the termination of said call for applying a marking signal to said calling line, an identifier responsive to the receipt of said marking signal from said calling line for identifying the calling line number, a register, control circuits for selectively controlling the connection of said register to said counter and identifier to register the counted number of message units and the identified line number, and recording means activated for recording the registered numbers for subsequent translation by said data processor into a bill for said call.

No references cited

DARYL W. COOK, *Primary Examiner.*